United States Patent
Morii et al.

(10) Patent No.: US 9,296,901 B2
(45) Date of Patent: Mar. 29, 2016

(54) COMPOSITE PARTICLES, AND COLORING COMPOSITION AND RESIN COMPOSITION USING THE SAME

(75) Inventors: Hiroko Morii, Hiroshima (JP); Kazuyuki Hayashi, Hiroshima (JP); Keisuke Iwasaki, Hiroshima (JP)

(73) Assignee: TODA KOGYO CORPORATION, Hiroshima (JP)

( * ) Notice: Subject to any disclaimer, the term of this patent is extended or adjusted under 35 U.S.C. 154(b) by 815 days.

(21) Appl. No.: 11/335,831

(22) Filed: Jan. 20, 2006

(65) Prior Publication Data

US 2006/0165991 A1    Jul. 27, 2006

(30) Foreign Application Priority Data

Jan. 26, 2005    (JP) .................................. 2005-18419

(51) Int. Cl.

| | | |
|---|---|---|
| C09C 1/00 | (2006.01) | |
| C09C 1/40 | (2006.01) | |
| B82Y 30/00 | (2011.01) | |
| C08K 9/04 | (2006.01) | |
| C08K 9/06 | (2006.01) | |
| C09C 1/02 | (2006.01) | |
| C09C 1/04 | (2006.01) | |
| C09C 1/30 | (2006.01) | |
| C09C 1/36 | (2006.01) | |
| C09C 1/64 | (2006.01) | |
| C09C 3/00 | (2006.01) | |
| C09C 3/12 | (2006.01) | |

(52) U.S. Cl.
CPC . *C09C 1/40* (2013.01); *B82Y 30/00* (2013.01); *C08K 9/04* (2013.01); *C08K 9/06* (2013.01); *C09C 1/00* (2013.01); *C09C 1/0015* (2013.01); *C09C 1/02* (2013.01); *C09C 1/027* (2013.01); *C09C 1/043* (2013.01); *C09C 1/309* (2013.01); *C09C 1/3063* (2013.01); *C09C 1/3081* (2013.01); *C09C 1/3669* (2013.01); *C09C 1/3684* (2013.01); *C09C 1/3692* (2013.01); *C09C 1/64* (2013.01); *C09C 1/642* (2013.01); *C09C 3/006* (2013.01); *C09C 3/12* (2013.01); *C01P 2004/20* (2013.01); *C01P 2004/32* (2013.01); *C01P 2004/60* (2013.01); *C01P 2004/62* (2013.01); *C01P 2004/64* (2013.01); *C01P 2004/80* (2013.01); *C01P 2006/12* (2013.01); *C01P 2006/62* (2013.01); *C01P 2006/63* (2013.01); *C01P 2006/64* (2013.01); *C01P 2006/65* (2013.01); *C01P 2006/82* (2013.01); *C09C 2200/1004* (2013.01); *C09C 2200/301* (2013.01); *C09C 2200/306* (2013.01); *Y10T 428/2991* (2015.01); *Y10T 428/2995* (2015.01)

(58) Field of Classification Search
CPC .... C09B 63/005; C09B 67/0008; C09B 63/00
USPC .................................. 428/403, 405; 106/445
See application file for complete search history.

(56) References Cited

U.S. PATENT DOCUMENTS

| | | | | |
|---|---|---|---|---|
| 3,939,087 | A * | 2/1976 | Vijayendran et al. | 430/114 |
| 4,566,908 | A * | 1/1986 | Nakatani et al. | 106/490 |
| 4,877,451 | A * | 10/1989 | Winnik et al. | 106/31.45 |
| 5,378,574 | A * | 1/1995 | Winnik et al. | 430/115 |
| 5,665,511 | A * | 9/1997 | Imai et al. | 430/108.24 |
| 5,885,342 | A * | 3/1999 | Gale et al. | 106/417 |
| 6,143,280 | A * | 11/2000 | Pike et al. | 424/49 |
| 6,596,071 | B2 * | 7/2003 | Hayashi et al. | 106/445 |
| 6,838,218 | B2 * | 1/2005 | Hayashi et al. | 430/108.3 |
| 7,022,752 | B2 | 4/2006 | Hayashi et al. | |
| 2001/0011110 | A1 * | 8/2001 | Hayashi et al. | 523/212 |
| 2003/0031895 | A1 * | 2/2003 | Kamigaki et al. | 428/694 BA |
| 2003/0175518 | A1 * | 9/2003 | Ishitani et al. | 428/403 |
| 2004/0081820 | A1 * | 4/2004 | Hayashi et al. | 428/325 |
| 2004/0235985 | A1 * | 11/2004 | Ichimura et al. | 523/200 |
| 2006/0165991 | A1 * | 7/2006 | Morii et al. | 428/403 |

FOREIGN PATENT DOCUMENTS

| | | |
|---|---|---|
| JP | 48-86927 | 2/1972 |
| JP | 07-331113 | 12/1995 |
| JP | 11-035840 | * 2/1999 |
| JP | 2002-356625 | 12/2002 |

OTHER PUBLICATIONS

Hawley's Condensed Chemical Dictionary, 14th Edition, 2002, John Wiley and Sons, Inc. accessed through Knovel Online.*
"Acid Dyes" reference. Obtained from http://chemicalland21.com/info/ACID%20DYES.htm on Dec. 28, 2011. No Author, No Date.*
Structure of Alkali Blue as a pigment, Handbook of Pigment, p. 41.
Structure of Alkali Blue as a dye, Sigma-Aldrich.
Notice of Reasons for Rejection and English translation in JP 2005-018419 mailed Feb. 23, 2011.

* cited by examiner

*Primary Examiner* — Michael A Salvitti
(74) *Attorney, Agent, or Firm* — Nixon & Vanderhye P.C.

(57) ABSTRACT

Composite particles of the present invention comprise white inorganic particles, a surface modifier coating layer formed on surface of the respective white inorganic particles, and a dye or lake coat adhered onto the surface of the respective surface-modifier-coated white inorganic particles. The composite particles of the present invention not only exhibit excellent color-developing property and tinting strength but also suppress bleeding.

28 Claims, No Drawings

COMPOSITE PARTICLES, AND COLORING COMPOSITION AND RESIN COMPOSITION USING THE SAME

BACKGROUND OF THE INVENTION

The present invention relates to composite particles, and a coloring composition and a resin composition using the composite particles. More particularly, the present invention relates to composite particles which not only exhibit excellent color-developing property and tinting strength but also suppress bleeding, a coloring composition obtained by dispersing the composite particles in a solvent, and a resin composition obtained by dispersing the composite particles in a rubber/resin composition.

Dyes are in general deteriorated in fastness such as light resistance, heat resistance and anti-bleeding property, but have been extensively used as a colorant for various paints, printing inks, cosmetics, rubber/resin compositions, or the like, because of clearness of color and high tinting strength thereof.

As techniques for improving such defects of the dyes, there have been proposed a method of fixing Red #226 onto the surface of inorganic particles or a nacreous pigment in various manners (Japanese Patent Application Laid-Open (KOKAI) No. 62-169716 (1987)), a method of adhering a nacreous pigment and a coloring pigment having the same surface charge to each other using a surface charge modifier (Japanese Patent Application Laid-Open (KOKAI) No. 4-332766 (1992)), a method of subjecting a mixture of a flake-like base material and a pigment and/or a dye to high-speed stirring treatment to form composite particles (Japanese Patent Application Laid-Open (KOKAI) No. 5-214257 (1993)), a method of adhering and/or fixing an organic dye or an organic pigment onto an inorganic compound using an inorganic salt (Japanese Patent Application Laid-Open (KOKAI) No. 11-35840 (1999)), or the like.

In addition, there has also been proposed a method of adhering an organic pigment onto the surface of white inorganic particles through a gluing agent such as alkoxysilanes (Japanese Patent Application Laid-Open (KOKAI) No. 2002-356625).

At present, it has been strongly required to provide composite particles which are capable of improving a dispersibility, a dispersion stability and a light resistance of paints and resin compositions, exhibit a high chromaticity and an excellent tinting strength, and suppress bleeding. However, such composite particles have not been obtained until now.

That is, in Japanese Patent Application Laid-Open (KOKAI) No. 62-169716 (1987), there are described various methods including the method of fixing sublimated Red #226 onto the surface of inorganic particles, or nacreous pigment, or the like. However, in these methods, the resultant composite particles tend to be insufficient in tinting strength and deteriorated in chromaticity inherent to dyes, and tend to cause problems such as bleeding.

In Japanese Patent Application Laid-Open (KOKAI) No. 4-332766 (1992), there is described the method of adhering a nacreous pigment and a coloring pigment having the same surface charge to each other using a surface charge modifier. However, in this method, since the adhering treatment is conducted in an aqueous medium such as water and, therefore, requires additional steps such as filtration and drying, the resultant colored nacreous composite pigment tends to be deteriorated in dispersibility, hardly exhibit a sufficient color-developing property and tinting strength, and cannot be fully prevented from bleeding.

In Japanese Patent Application Laid-Open (KOKAI) No. 5-214257 (1993), there is described the method of subjecting a mixture of a flake-like base material and a pigment and/or a dye to high-speed stirring treatment to form composite particles. However, in this method, since the ordered mixture fails to show a sufficient bonding force to the surface of particles as a nucleus, the resultant composite particles tend to be insufficient in tinting strength and effect of inhibiting occurrence of bleeding, and deteriorated in chromaticity thereof, as well as tend to suffer from flooding when formed into paints.

In Japanese Patent Application Laid-Open (KOKAI) No. 11-35840 (1999), there is described the method of adhering and/or fixing an organic dye or an organic pigment onto an inorganic compound using an inorganic salt. However, in this method, the resultant composite particles tend to be deteriorated in chromaticity and color-developing property and, therefore, may fail to show a sufficient tinting strength.

In Japanese Patent Application Laid-Open (KOKAI) No. 2002-356625, there is described the method of adhering an organic pigment onto the surface of white inorganic particles through a gluing agent such as alkoxysilanes. However, in this method, due to the organic pigment to be adhered, it may be difficult to obtain a colorant having a high chromaticity and a high tinting strength.

As a result of the present inventors' earnest study, it has been found that by coating the surface of white inorganic particles with a surface modifier and then adhering a dye or a lake (dyed lake) onto the surface of the thus coated particles, composite particles obtained are useful as a coloring composition for water-based or solvent-based paints and as a colorant for colored resin compositions, are excellent in color-developing property and tinting strength, and can be prevented from bleeding. The present invention has been attained on the basis of the finding.

SUMMARY OF THE INVENTION

An object of the present invention is to provide composite particles which are capable of improving a dispersibility, a dispersion stability and a light resistance of paints and resin compositions, exhibit a high chromaticity and an excellent tinting strength, and can be prevented from bleeding.

To accomplish the aim, in a first aspect of the present invention, there is provided composite particles comprising white inorganic particles, a surface modifier coating layer formed on surface of the respective white inorganic particles, and a dye coat adhered onto surface of the respective surface modifier-coated white inorganic particles.

In a second aspect of the present invention, there is provided composite particles comprising white inorganic particles, a surface modifier coating layer formed on surface of the respective white inorganic particles, and a lake coat adhered onto surface of the respective surface modifier-coated white inorganic particles.

In a third aspect of the present invention, there is provided a coloring composition for water-based paints obtained by dispersing the composite particles as defined in the above aspect 1 or 2 in water and/or a water-soluble solvent.

In a fourth aspect of the present invention, there is provided a coloring composition for solvent-based paints obtained by dispersing the composite particles as defined in the above aspect 1 or 2 in a organic solvent.

In a fifth aspect of the present invention, there is provided a resin composition which is tinted with the composite particles as defined in the above aspect 1 or 2.

DETAILED DESCRIPTION OF THE INVENTION

The present invention is described in detail below.

First, the composite particles according to the present invention are described.

The composite particles according to the present invention, comprise white inorganic particles as core particles, a surface modifier coating layer formed on the surface of the respective white inorganic particles, and a dye coat or a lake coat adhered onto the surface of the respective surface modifier-coated white inorganic particles.

As the white inorganic particles used in the present invention, there may be exemplified white pigments such as titanium dioxide and zinc oxide; nacreous pigments such as titanium mica and muscovite; fine silica particles such as silica powder, white carbon, fine silicic acid powder and diatomaceous earth; and extender pigments such as clay, calcium carbonate, barium sulfate, alumina white, talc and transparent titanium oxide. The white inorganic particles may be appropriately selected from the above materials according to properties as required therefor or applications thereof. For example, the white pigments are preferably used in applications requiring a hiding power, the nacreous pigments are preferably used in applications requiring pearl-like gloss, and the nacreous pigments, fine silica particles or extender pigments, in particular, the fine silica particles or the extender pigments, are preferably used in applications requiring a transparency.

The white inorganic particles have an average particle diameter of usually 0.001 to 10.0 µm, preferably 0.005 to 9.5 µm, more preferably 0.01 to 9.0 µm. The white inorganic particles may have any suitable shape such as a spherical shape, a granular shape, a polyhedral shape, an acicular shape, a spindle shape, a rice grain-like shape, a flake shape, a scale shape and a plate shape.

When the average particle diameter of the white inorganic particles is more than 10.0 µm, the obtained composite particles tend to become coarse, resulting in deteriorated tinting strength thereof.

The white inorganic particles used in the present invention have a geometrical standard deviation value of particle diameter of usually not more than 2.0, preferably not more than 1.8, more preferably not more than 1.5. When the geometrical standard deviation value of particle diameter of the white inorganic particles is more than 2.0, the resultant composite particles tends to have a broad particle size distribution, resulting in poor dispersibility and dispersion stability in paint compositions as well as poor dispersibility in resin compositions.

The white inorganic particles used in the present invention usually have a BET specific surface area value of not less than 0.5 $m^2/g$. When the BET specific surface area value is less than 0.5 $m^2/g$, the obtained white inorganic particles tend to become coarse, or sintering is caused within or between the particles, so that the obtained composite particles also tend to become coarse, resulting in deteriorated tinting strength. In the consideration of a good tinting strength of the obtained composite particles, the BET specific surface area value of the white inorganic particles is preferably not less than 1.0 $m^2/g$, more preferably not less than 1.5 $m^2/g$. In the consideration of forming a uniform gluing agent coating layer on the surface of the respective white inorganic particles and uniformly adhering the dye or lake onto the surface of the particles, the upper limit of the BET specific surface area value of the white inorganic particles is usually about 500 $m^2/g$, preferably 400 $m^2/g$, more preferably 300 $m^2/g$.

The water content in the white inorganic particles used in the present invention is usually 0.1 to 10.0%, preferably 0.3 to 9.0%. When the water content in the white inorganic particles is less than 0.1%, it may be difficult to uniformly coat the surface of the respective white inorganic particles with the surface modifier.

As to the hue of the white inorganic particles, the chromaticity thereof is preferably as low as possible. More specifically, the $L^*$ value of the white inorganic particles is usually not less than 70.00, preferably not less than 75.00; and the $C^*$ value thereof is usually not more than 18.00, preferably not more than 15.00, more preferably not more than 12.00, still more preferably not more than 9.00. When the $L^*$ value and $C^*$ value are out of the above-specified ranges, the white inorganic particles may fail to show a sufficiently low chromaticity, so that it may be difficult to obtain composite particles having a high chromaticity and an excellent color-developing property.

As to the light resistance of the white inorganic particles used in the present invention, the lower limit of the $\Delta E^*$ value thereof is more than 5.0, and the upper limit of the $\Delta E^*$ value is usually 12.0, preferably 11.0 and more preferably 10.0 as measured by the below-mentioned evaluation method.

The surface modifier used in the present invention may be of any kind as long as the dye or the lake can be adhered onto the surface of the white inorganic particles therethrough. Examples of the preferred surface modifier may include organosilicon compounds such as alkoxysilanes, fluoroalkylsilanes, silane-based coupling agents and organopolysiloxanes, and various other coupling agents such as titanate-based coupling agents, aluminate-based coupling agents and zirconate-based coupling agents. Among these surface modifiers, preferred are the alkoxysilanes, the silane-based coupling agents, the organopolysiloxanes, the titanate-based coupling agents, the aluminate-based coupling agents and the zirconate-based coupling agents.

Specific examples of the organosilicon compounds may include the alkoxysilanes such as methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, ethyl triethoxysilane, propyl triethoxysilane, butyl triethoxysilane, isobutyl trimethoxysilane, hexyl triethoxysilane, octyl triethoxysilane and decyl triethoxysilane; the fluoroalkylsilanes such as trifluoropropyl trimethoxysilane, tridecafluorooctyl trimethoxysilane, heptadecafluorodecyl trimethoxysilane, trifluoropropyl triethoxysilane, heptadecafluorodecyl triethoxysilane and tridecafluorooctyl triethoxysilane; the silane-based coupling agents such as vinyl trimethoxysilane, vinyl triethoxysilane, γ-aminopropyl triethoxysilane, γ-glycidoxypropyl trimethoxysilane, γ-mercaptopropyl trimethoxysilane, γ-methacryloxypropyl trimethoxysilane, N-β(aminoethyl)-γ-aminopropyl trimethoxysilane, γ-glycidoxypropylmethyl dimethoxysilane and γ-chloropropyl trimethoxysilane; and the organopolysiloxanes such as polysiloxanes, methyl hydrogen polysiloxanes and modified polysiloxanes.

Examples of the titanate-based coupling agents may include isopropyltristearoyl titanate, isopropyltris(dioctylpyrophosphate)titanate, isopropyltri(N-aminoethyl-aminoethyl)titanate, tetraoctylbis(ditridecylphosphate)titanate, tetra (2,2-diaryloxymethyl-1-butyl)bis(ditridecyl)phosphate titanate, bis(dioctylpyrophosphate)oxyacetate titanate and bis(dioctylpyrophosphate)ethylene titanate.

Examples of the aluminate-based coupling agents may include acetoalkoxyaluminum diisopropylate, aluminumdiisopropoxymonoethylacetoacetate, aluminumtrisethylacetoacetate and aluminumtrisacetylacetonate.

Examples of the zirconate-based coupling agents may include zirconiumtetrakisacetylacetonate, zirconiumdibutoxybisacetylacetonate, zirconiumtetrakisethylacetoacetate, zirconiumtributoxymonoethylacetoacetate and zirconiumtributoxyacetylacetonate.

The amount of the surface modifier coating layer is usually 0.01 to 15.0% by weight, preferably 0.02 to 12.5% by weight, more preferably 0.03 to 10.0% by weight (calculated as C) based on the weight of the white inorganic particles. When the amount of the surface modifier coating layer is less than 0.01% by weight, it may be difficult to adhere the dye or the lake onto the white inorganic particles in an amount of not less than 0.01 part by weight based on 100 parts by weight of the white inorganic particles. When the amount of the surface modifier coating layer is more than 15.0% by weight, it is possible to adhere the dye or the lake onto the white inorganic particles in an amount of 0.01 to 500 parts by weight based on 100 parts by weight of the white inorganic particles. Therefore, it is unnecessary to form the surface modifier coating layer in an amount of more than 15.0% by weight.

Examples of the dye usable in the present invention may include a direct dye, an acid dye, a basic dye, a mordant dye, a naphthol dye, a sulfur dye, a vat dye, a disperse dye, a reactive dye and an soluvent dye.

The lake usable in the present invention may be produced, for example, by insolubilizing the above dye with a precipitant.

Specific examples of the dye may include known dyes such as amaranth, etythrosine, new coccin, phloxine B, rose bengal, acid red, tartrazine, sunset yellow FCF, fast green FCF, brilliant blue FCF, indigo carmine, lithol rubin B, rhodamine B, rhodamine B acetate, rhodamine B stearate, tetrachlorotetrabromofluorescein, tetrabromfluorescein, Sudan III, helindone pink CN, fast acid magenta, eosine YS, eosine YSK, phloxine BK, rose bengal K, dibromofluorescein, orange II, diiodofluorescein, erythrosine yellow NA, fluorescein, uranine, uranine K, quinoline yellow WS, quinoline yellow SS, alizarin cyanine green F, quinizarine green SS, pyranine conc, light green SF yellowish, indigo, patent blue NA, patent blue CA, carbanthrene blue, alphazurine FG, resorcin brown, alizurin purple SS, violamine R, Scarlet Red N.F., Ponceau 3R, Ponceau R, Ponceau SX, oil red XO, fast red S, orange I, orange SS, polar yellow 5G, naphthol yellow S, yellow AB, yellow OB, metanil yellow, fast light yellow 3G, naphthol green B, guinea green B, Sudan blue B, alizurol purple, naphthol blue black, alkali blue, turquoise blue, alizarin, basic flavin, auramine, rhodamine 6G, anthrafloxine, methyl violet, crystal violet, Victoria blue BO, Victoria blue B, basic cyanine, diamond green, malachite green, magenta, quinizarine, thioflavin and phthalein. These dyes may be used alone or in the form of a mixture of any two or more thereof according to hues as required.

As the lake, there may be used those obtained by forming dyes into an aluminum-, barium- or zirconium-lake using aluminum-based lake-forming agents, barium-based lake-forming agents, zirconium-based lake-forming agents, which are available as commercial products. These lakes may be used alone or in the form of a mixture of any two or more thereof according to hues as required.

The amount of the dye or the lake adhered varies depending upon a surface area of the white inorganic particles, and is usually 0.01 to 500 parts by weight, preferably 0.05 to 400 parts by weight, more preferably 0.1 to 300 parts by weight based on 100 parts by weight of the white inorganic particles. When the amount of the dye or the lake adhered is less than 0.01 part by weight, it may be difficult to obtain composite particles having a high chromaticity and an excellent tinting strength. On the other hand, when the amount of the dye or the lake adhered is more than 500 parts by weight, it may be difficult to form a uniform dye or lake adhesion coat.

The shape and size of the composite particles according to the present invention may vary depending upon those of the white inorganic particles as core particles. The composite particles have a particle configuration or shape similar to that of the core particles.

The composite particles of the present invention may have any suitable shape such as a spherical shape, a granular shape, an acicular shape, a spindle shape, a rice grain-like shape, a flake shape, a plate shape and an amorphous shape.

The particle diameter of the composite particles of the present invention may be appropriately selected according to the applications thereof. For example, the composite particles of the present invention have an average particle diameter of usually 0.001 to 10.0 µm, preferably 0.005 to 9.5 µm, more preferably 0.01 to 9.0 µm. When the average particle diameter of the composite particles is more than 10.0 µm, the composite particles tend to be deteriorated in tinting strength due to a too large particle size thereof.

The composite particles of the present invention have a geometrical standard deviation value of particle diameter of usually not more than 2.0, preferably not more than 1.8, more preferably not more than 1.5. When the composite particles have a the geometrical standard deviation value of particle diameter of more than 2.0, the resultant composite particles tend to have a broad particle size distribution, resulting in poor dispersibility and dispersion stability thereof in paint compositions as well as poor dispersibility in resin compositions. The lower limit of the geometrical standard deviation value is usually 1.01.

The BET specific surface area value of the composite particles according to the present invention is usually not less than 0.5 m$^2$/g. When the BET specific surface area value of the composite particles is less than 0.5 m$^2$/g, the obtained composite particles tend to become coarse, resulting in deteriorated tinting strength. As a result, the obtained composite particles may be unsuitable as a colorant for resin compositions. In the consideration of a good tinting strength of the obtained composite particles, the BET specific surface area value thereof is preferably not less than 1.0 m$^2$/g, more preferably not less than 1.5 m$^2$/g. In the consideration of a good dispersibility and dispersion stability in paint compositions as well as a good dispersibility in resin compositions, the upper limit of BET specific surface area value of the composite particles according to the present invention is about 500 m$^2$/g, preferably 400 m$^2$/g, more preferably 300 m$^2$/g.

The change in chromaticity of the composite particles according to the present invention is usually not more than 20%, preferably not more than 18%, more preferably not more than 16% on the basis of chromaticity of the dye or the lake solely to be adhered onto the particles.

The tinting strength of the composite particles according to the present invention is usually not less than 102%, preferably not less than 106%, more preferably not less than 110% as measured by the below-mentioned evaluation method.

As to the light resistance of the composite particles according to the present invention, the $\Delta E^*$ value thereof is usually not more than 10.0, preferably not more than 9.0, more preferably not more than 8.0 as measured by the below-mentioned evaluation method.

The anti-bleeding property of the composite particles according to the present invention is usually not less than 94%, preferably not less than 95%, more preferably not less than 96% as measured in any of water-based and solvent-based compositions by the below-mentioned evaluation method.

Next, the coloring composition for water-based paints and the coloring composition for solvent-based paints, which contain the composite particles of the present invention (hereinafter referred to merely as a "coloring composition for paints") are described.

The coloring composition for paints comprise the composite particles of the present invention and a solvent, if required, together with a dispersant, a resin, or the like.

As the solvent for the coloring composition for water-based paints, there may be used water and/or a water-soluble organic solvent ordinarily used in water-based paints. Specific examples of the water-soluble organic solvents may include alcohol-based solvents such as ethyl alcohol, propyl alcohol and butyl alcohol; glycol ether-based solvents such as methyl cellosolve, ethyl cellosolve, propyl cellosolve and butyl cellosolve; oxyethylene or oxypropylene addition polymers such as diethyleneglycol, triethyleneglycol, polyethyleneglycol, dipropyleneglycol, tripropyleneglycol and polypropyleneglycol; alkyleneglycols such as ethyleneglycol, propyleneglycol and 1,2,6-hexanetriol; glycerol; 2-pyrrolidone; or the like.

As the solvent for the coloring composition for solvent-based paints, there may be used organic solvents ordinarily used for solvent-based paints. Specific examples of the organic solvent for the coloring composition for solvent-based paints may include soybean oil; toluene; xylene; thinner; butyl acetate; methyl acetate; methyl isobutyl ketone; glycol ether-based solvents such as methyl cellosolve, ethyl cellosolve, propyl cellosolve, butyl cellosolve and propyleneglycol monomethyl ether; ester-based solvents such as ethyl acetate, butyl acetate and amyl acetate; aliphatic hydrocarbon-based solvents such as hexane, heptane and octane; alicyclic hydrocarbon-based solvents such as cyclohexane; petroleum-based solvents such as mineral spirits; ketone-based solvents such as acetone and methyl ethyl ketone; alcohol-based solvents such as methyl alcohol, ethyl alcohol, propyl alcohol and butyl alcohol; other aliphatic hydrocarbons; or the like.

The content of the composite particles in the coloring composition for paints according to the present invention is usually 1 to 200 parts by weight, preferably 3 to 150 parts by weight, more preferably 5 to 100 parts by weight based on 100 parts by weight of the solvent.

As to the dispersion stability of the coloring composition for paints according to the present invention, the $\Delta E^*$ value thereof is usually not more than 1.2, preferably not more than 1.0 as measured by the below-mentioned evaluation method, and as to the light resistance of a coating film produced from the coloring composition for paints, the $\Delta E^*$ value thereof is usually not more than 10.0, preferably not more than 9.0 as measured by the below-mentioned evaluation method.

The coloring composition for paints according to the present invention can be used as a paint by blending with a resin for water-based paints or a resin for solvent-based paints, if required, together with oils and fats, a defoamer, an extender pigment, a drying agent, a surfactant, a hardener, an assistant or the like according to various applications thereof, and diluting and dispersing the obtained mixture.

Examples of the resin for water-based paints may include those resins ordinarily used for water-based paints or water-based inks. Specific examples of the resin for water-based paints may include water-soluble acrylic resins, water-soluble styrene-maleic acid resins, water-soluble alkyd resins, water-soluble melamine resins, water-soluble urethane emulsion resins, water-soluble epoxy resins, water-soluble polyester resins, or the like.

Examples of the resin for solvent-based paints may include those resins ordinarily used for solvent-based paints or oil-based printing inks. Specific examples of the resin for solvent-based paints may include acrylic resins, alkyd resins, polyester resins, polyurethane resins, epoxy resins, phenol resins, melamine resins, amino resins, vinyl chloride resins, silicone resins, rosin-based resins such as gum rosin and lime rosin, maleic acid resins, polyamide resins, nitrocellulose, ethylene-vinyl acetate copolymer resins, rosin-modified resins such as rosin-modified phenol resins and rosin-modified maleic acid resins, petroleum resins, or the like.

As the oils and fats, there may be used boiled oils produced by processing drying oils such as linseed oil, tung oil, oiticica oil and safflower oil.

As the defoamer, there may be used commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" (all produced by SUN NOPCO CO., LTD.), "ANTI-FOAM 08 (tradename)" and "EMARGEN 903 (tradename)" (both produced by KAO CO., LTD.), or the like.

When the water-based paint obtained from the coloring composition for water-based paints according to the present invention is formed into a coating film, the gloss of the coating film is usually 70 to 110%, preferably 75 to 110%. As to the light resistance of the coating film, the $\Delta E^*$ value thereof is usually not more than 10.0, preferably not more than 9.0.

Also, when the solvent-based paint obtained from the coloring composition for solvent-based paints according to the present invention is formed into a coating film, the gloss of the coating film is usually 75 to 110%, preferably 80 to 110%. As to the light resistance of the coating film, the $\Delta E^*$ value thereof is usually not more than 10.0, preferably not more than 9.0.

Next, the resin composition tinted with the composite particles according to the present invention is described.

The resin composition tinted with the composite particles according to the present invention exhibits a dispersing condition of usually Rank 3, 4 or 5, preferably Rank 4 or 5, more preferably Rank 5 as visually observed and evaluated by the below-mentioned method, and a light resistance ($\Delta E^*$ value) of usually not more than 10.0, preferably not more than 9.0.

The amount of the composite particles blended in the resin composition according to the present invention is usually 0.01 to 200 parts by weight based on 100 parts by weight of resins contained in the composition. In the consideration of a good handling property of the resin composition, the amount of the composite particles blended therein is preferably 0.05 to 150 parts by weight, more preferably 0.1 to 100 parts by weight based on 100 parts by weight of the resins.

The base materials of the resin composition according to the present invention comprise the composite particles and known thermoplastic resins, and may further contain, if required, known additives such as lubricants, plasticizers, antioxidants, ultraviolet light absorbers, various stabilizers, or the like.

Examples of the thermoplastic reins may include polyolefins such as polyethylene, polypropylene, polybutene and polyisobutylene; thermoplastic resins such as polyvinyl chloride, polymethyl pentene, polyethylene terephthalate, polybutylene terephthalate, polystyrene, styrene-acrylic ester copolymers, styrene-vinyl acetate copolymers, acrylonitrile-butadiene-styrene copolymers, acrylonitrile-EPDM-styrene copolymers, acrylic resins, polyamides, polycarbonates, polyacetals and polyurethanes; rosin-modified maleic acid resins; phenol resins; epoxy resins; polyester resins; silicone resins; rosin esters; rosins; natural rubbers; synthetic rubbers; or the like.

The additives for the thermoplastic resin may be added in an amount of usually not more than 50% by weight based on the total amount of the composite particles and the resin. When the amount of the additives added is more than 50% by weight, the obtained resin composition tends to be deteriorated in moldability.

The resin composition of the present invention may be produced by previously intimately mixing the raw resin material with the composite particles, and then kneading the resultant mixture using a kneader or an extruder under heating while applying a strong shear force thereto in order to uniformly disperse the composite particles in the resin. Then, the obtained resin composition is molded into an aimed shape upon use.

Next, the process for producing the composite particles according to the present invention is described.

The composite particles of the present invention can be produced by first mixing the white inorganic particles with the surface modifier to coat the surface of the respective white inorganic particles with the surface modifier, and then mixing the thus-obtained surface modifier-coated white inorganic particles with the dye or the lake to adhere the dye or the lake onto the surface modifier coating layer.

Upon coating the surface of the respective white inorganic particles with the surface modifier, it is preferred that the water content on the surface of the respective white inorganic particles is previously controlled to usually 0.1 to 10.0%, preferably 0.3 to 9.0%. By controlling the water content to the range of 0.1 to 10.0%, the surface modifier can be more efficiently coated onto the surface of the respective white inorganic particles.

The surface modifier coating layer may be formed on the surface of the respective white inorganic particles by mechanically mixing and stirring the white inorganic particles with the surface modifier or a surface modifier-containing solution, or by mechanically mixing and stirring the white inorganic particles while spraying the surface modifier or the surface modifier-containing solution thereonto.

The mixing and stirring of the white inorganic particles with the surface modifier, and the mixing and stirring of the dye or the lake with the surface modifier-coated white inorganic particles, is preferably carried out using an apparatus capable of applying a shear force to the powder mixture, in particular, such an apparatus capable of simultaneously effecting shear action, spatula stroking and compression. Examples of such apparatuses may include wheel-type kneaders, ball-type kneaders, blade-type kneaders, roll-type kneaders or the like. Among these apparatuses, the wheel-type kneaders are more effectively usable in the present invention.

Specific examples of the wheel-type kneaders may include edge runners (similar in meaning to mix muller, Simpson mill and sand mill), multimill, Stotz mill, Wet pan mill, corner mill, ring muller or the like. Among these kneaders, preferred are edge runners, multimill, Stotz mill, Wet pan mill and ring muller, and more preferred are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions for mixing and stirring the surface modifier with the white inorganic particles may be selected so as to uniformly coat the surface of the respective white inorganic particles with the surface modifier. More specifically, the mixing and stirring conditions may be appropriately controlled such that the linear load is usually 19.6 to 1960 N/cm, preferably 98 to 1470 N/cm, more preferably 147 to 980 N/cm; the treating time is usually 5 min to 24 hours, preferably 10 min to 20 hours; and the stirring speed is usually 2 to 2000 rpm, preferably 5 to 1000 rpm, more preferably 10 to 800 rpm.

After the surface of the respective white inorganic particles is coated with the surface modifier, the dye or the lake is added and then mixed and stirred with the surface modifier-coated white inorganic particles to adhere the dye or the lake onto the surface modifier coating layer thereof. Further, the resultant particles may be dried or heat-treated, if required.

The dye or the lake may be added slowly and little by little, for example, for a period of usually 5 min to 20 hours, preferably 5 min to 20 hours. Alternatively, the dye or the lake may be added in divided parts, for example, an amount of usually 0.01 to 25 parts by weight for each, to 100 parts by weight of the white inorganic particles until the amount of the dye or the lake added reaches an aimed value.

The mixing and stirring conditions may be appropriately selected so as to form a uniform dye or lake coat on the surface modifier coating layer. More specifically, the mixing and stirring conditions may be controlled such that the linear load is usually 19.6 to 1960 N/cm, preferably 98 to 1470 N/cm, more preferably 147 to 980 N/cm; the treating time is usually 5 min to 24 hours, preferably 10 min to 20 hours; and the stirring speed is usually 2 to 2000 rpm, preferably 5 to 1000 rpm and more preferably 10 to 800 rpm.

The heating temperature used in the drying and heating treatments is usually 40 to 80° C., preferably 50 to 70° C., and the heating time is usually 10 min to 6 hours, preferably 30 min to 3 hours.

Meanwhile, in the case where alkoxysilanes or fluoroalkylsilanes are used as the surface modifier, the alkoxysilanes are finally coated in the form of organosilane compounds produced from the alkoxysilanes or fluorine-containing organosilane compounds produced from the fluoroalkylsilanes through these steps.

The composite particles of the present invention have a high chromaticity and an excellent tinting strength, and suppress bleeding, and therefore, the composite particles are suitable as coloring composite particles for paints and resin compositions. In addition, the composite particles of the present invention exhibit not only a high tinting strength, but also broaden a coloring range of the used dye or the used lake as compared to the conventional techniques by appropriately selecting the core particles. Further, according to the production method of the present invention, the dye or the lake can be strongly adhered onto the surface of the white inorganic particles have nothing to do with the surface charge or the acidity or basicity of the particles. Therefore, the present invention is advantageous from industrial viewpoints.

The coloring composition for paints according to the present invention can provide a paint having excellent dispersibility, light resistance and storage stability, and therefore, is suitable as a coloring composition for paints.

The resin composition of the present invention is suitable as a resin composition having excellent dispersibility and light resistance.

EXAMPLES

The present invention is described in more detail by Examples, but these Examples are only illustrative and not intended to limit the scope of the present invention.

Various properties were measured and evaluated by the following methods.

(1) The average particle diameter of the particles was expressed by an average value of particle diameters of 350 particles measured from a micrograph obtained using a transmission electron microscope.

(2) The particle size distribution of the particles was expressed by a geometrical standard deviation value thereof measured by the following method.

That is, the particle diameters were measured from the above magnified micrograph. The actual particle diameters and the number of the particles were obtained from the calculation on the basis of the measured values. On a logarithmic normal probability paper, the particle diameters were plotted at regular intervals on the abscissa axis and the accumulative number of particles (under integration sieve) belonging to each interval of the particle diameters were plotted by percentage on the ordinate axis by a statistical technique. The particle diameters corresponding to the number of particles of 50% and 84.13%, respectively, were read from the graph, and the geometrical standard deviation value was calculated from the following formula:

Geometrical standard deviation value={particle diameter corresponding to 84.13% under integration sieve}/{particle diameter(geometrical average diameter) corresponding to 50% under integration sieve}

The more the geometrical standard deviation value nears 1.0, the more excellent the particle size distribution of the particles.

(3) The specific surface area was expressed by the value measured by a BET method.

(4) The water content in the white inorganic particles was measured using a trace water content measuring apparatus "AQ-6" (manufactured by HIRANUMA SANGYO CO., LTD.).

(5) As to the hues of the white inorganic particles, the dye, the lake and the composite particles, the sample particles were press-molded into a flat plate-shaped test specimen under a pressure of $1.96 \times 10^8$ Pa (2000 Kg/cm$^2$), and the hue of the test specimen was measured using a spectro-colorimeter "CM-3610d" (manufactured by MINOLTA CO., LTD.). The hues were respectively expressed by color indices according to JIS Z 8929.

(6) The change in chromaticity of the composite particles was calculated from the chromaticity C* value of the above obtained composite particles and the chromaticity Cs* value of the dye or the lake solely, which are used for producing the composite particles, according to the following formula:

Percentage of change in chromaticity=[(Cs*value)−(C*value)]/(Cs*value)×100

(7) The amount of the surface modifier coated onto the surface of the white inorganic particles and the amount of the dye or the lake adhered onto the composite particles were expressed by the carbon content measured using "Horiba Metal, Carbon and Sulfur Analyzer EMIA-2200 Model" (manufactured by HORIBA SEISAKUSHO CO., LTD.) by the following method.

That is, the amount of carbon per unit weight of the white inorganic particles as core particles was previously measured, and then the amount of carbon in the composite particles was measured to calculate the difference in weight of carbon therebetween as the amount of the dye or the lake adhered.

(8) The tinting strength of the composite particles was measured by the following method.

That is, a primary color enamel and a vehicle enamel prepared by the below-mentioned methods were respectively applied on a cast-coated paper by a 150 μm (6-mil) applicator to produce coating film pieces. The hues of the thus obtained coating film pieces were measured by a spectro-colorimeter "CM-3610d" (manufactured by MINOLTA CO., LTD.) to determine L* values thereof. The difference between the obtained L* values was represented by a ΔL* value.

Next, by using as a standard sample the dye or the lake used for the production of the composite particles, the same procedure as defined above was conducted to prepare a primary color enamel and a vehicle enamel, form coating film pieces and measure L* values thereof. The difference between the L* values was represented by a ΔLs* value.

From the obtained ΔL* value of the composite particles and ΔLs* value of the standard sample, the tinting strength (%) was calculated according to the following formula:

Tinting strength(%)=100+{(ΔLs*−ΔL*)×10}

Preparation of Primary Color Enamel:

3 g of the above sample particles, 16 g of an amino alkyd resin and 10 g of a thinner were blended with each other. The resultant mixture was added together with 90 g of 3 mmϕ glass beads into a 140 mL glass bottle, and then mixed and dispersed for 60 min by a paint shaker. The obtained mixture was mixed with 50 g of an amino alkyd resin, and further dispersed for 5 min by a paint shaker, thereby obtaining a primary color enamel.

Preparation of Vehicle Enamel:

12 g of the above-prepared primary color enamel and 40 g of Amirac White (titanium dioxide-dispersed amino alkyd resin) were blended with each other, and the resultant mixture was mixed and dispersed for 15 min by a paint shaker, thereby preparing a vehicle enamel.

(9) The light resistances of the white inorganic particles, the dye, the lake and the composite particles were measured by the following method.

That is, the same primary color enamel as prepared above for the measurement of tinting strength, was applied onto a cold-rolled steel plate (0.8 mm×70 mm×150 mm; JIS G-3141) and dried to form a coating film having a thickness of 150 μm. One half of the thus prepared test specimen was covered with a metal foil, and an ultraviolet light was continuously irradiated over the test specimen at an intensity of 100 mW/cm$^2$ for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(10) The anti-bleeding property of each of the dye, the lake and the composite particles in water was measured by the following method. That is, 1 g of the sample particles to be measured and 50 mL of purified water were placed in a conical flask and then was subjected to ultrasonic dispersion for 60 min. Thereafter, the obtained dispersion was subjected to centrifugal separation at a rotating speed of 10000 rpm for 15 min to separate a supernatant therefrom. Next, the light transmittance of the thus separated supernatant was measured in a wavelength range of 380 to 720 nm by a UV-visible recording spectrophotometer "UV-2100" (manufactured by SHIMADZU SEISAKUSHO CO., LTD.). The anti-bleeding property was expressed by the minimum light transmittance in the measured range.

The anti-bleeding property of each of the dye, the lake and the composite particles in a solvent was measured by the following method. That is, 1 g of the sample particles to be measured and 50 mL of ethanol were placed in a conical flask and then was subjected to ultrasonic dispersion for 60 min. Thereafter, the obtained dispersion was subjected to centrifugal separation at a rotating speed of 10000 rpm for 15 min to separate a supernatant therefrom. Next, the light transmittance of the thus separated supernatant was measured in a wavelength range of 380 to 720 nm by a UV-visible recording spectrophotometer "UV-2100" (manufactured by SHIMADZU SEISAKUSHO CO., LTD.). The anti-bleeding property was expressed by the minimum light transmittance in the measured range.

(11) The dispersion stability of the coloring composition for paints was measured by the following method. That is, the coloring composition for paints was applied on a cast-coated paper by using a 150 μm (6-mil) applicator to produce a coating film piece. The hues of the thus obtained coating film piece as well as a coating film piece obtained by applying the coloring composition for paints which was allowed to stand at 25° C. for one week, on a cast-coated paper and then drying, were measured by a spectro-colorimeter "CM-3610d" manufactured by MINOLTA CO., LTD., to determine $L^*$, $a^*$ and $b^*$ values thereof, respectively. The dispersion stability was expressed by the $\Delta E^*$ value calculated from differences between the measured hue values according to the following formula:

$$\Delta E^* = [(\Delta L^*)^2 + (\Delta a^*)^2 + (\Delta b^*)^2]^{1/2}$$

wherein $\Delta L^*$ represents the difference between $L^*$ values of the samples before and after being allowed to stand; $\Delta a^*$ represents the difference between $a^*$ values of the samples before and after being allowed to stand; and $\Delta b^*$ represents the difference between $b^*$ values of the samples before and after being allowed to stand.

(12) The light resistance of the coloring composition for paints was measured by the following method. That is, the coloring composition for paints was applied on a cast-coated paper by using a 150 μm (6-mil) applicator to produce a coating film piece. One half of the coating film piece as a test specimen was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues ($L^*$, $a^*$ and $b^*$ values) of the metal foil-covered non-irradiated portion and the UV-irradiated portion of the test specimen were respectively measured. The light resistance was expressed by the $\Delta E^*$ value calculated from differences between the measured hue values of the non-irradiated portion and the UV-irradiated portion according to the above-described formula.

(13) The gloss of a coating film of the paint obtained from the coloring composition for paints was measured by the following method. That is, the respective paints prepared by the below-mentioned method were applied onto a cold-rolled steel plate (0.8 mm×70 mm×150 mm; JIS G-3141) and dried to form a coating film having a thickness of 150 μm. The gloss of the obtained coating film piece was measured by irradiating light thereto at an incident angle of 60° using a gloss meter "UGV-5D" (manufactured by SUGA TESTING MACHINES MANUFACTURING CO., LTD.). The higher the gloss, the more excellent the dispersibility of the paint containing the composite particles.

(14) The hue of a coating film of the paint obtained from the coloring composition for paints was measured by the following method. That is, the hue of the coating film piece prepared for the above gloss measurement was measured using a spectro-colorimeter "CM-3610d" (manufactured by MINOLTA CO., LTD.). The hue was expressed by a color index according to JIS Z 8929.

(15) The light resistance of a coating film of the paint obtained from the coloring composition for paints was measured by the following method. That is, one half of the coating film piece prepared for the above gloss measurement as a test specimen was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues ($L^*$, $a^*$ and $b^*$ values) of the metal foil-covered non-irradiated portion and the UV-irradiated portion of the test specimen were respectively measured. The light resistance was expressed by the $\Delta E^*$ value calculated from differences between the measured hue values of the non-irradiated portion and the UV-irradiated portion according to the above-described formula.

(16) The hue of a resin composition tinted with the composite particles was measured by the following method. That is, the hue of a colored resin plate prepared by the below-mentioned method was measured using a spectro-colorimeter "CM-3610d" (manufactured by MINOLTA CO., LTD.). The hue was expressed by a color index according to JIS Z 8929.

(17) The light resistance of the respective resin compositions was measured by the following method. That is, one half of the above-prepared resin plate for measuring the hue of the resin composition as a test specimen was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues ($L^*$, $a^*$ and $b^*$ values) of the metal foil-covered non-irradiated portion and the UV-irradiated portion of the test specimen were respectively measured. The light resistance was expressed by the $\Delta E^*$ value calculated from differences between the measured hue values of the non-irradiated portion and the UV-irradiated portion according to the above-described formula.

(18) The dispersibility of the composite particles in the resin composition was evaluated by visually observing the surface of the colored resin plate obtained from the resin composition to count the number of undispersed aggregated particles. The results were classified into 5 ranks. Rank 5 indicates the most excellent dispersing condition.

Rank 5: No undispersed particles were recognized;

Rank 4: Not less than 1 but less than 5 undispersed particles per 1 cm² were recognized;

Rank 3: Not less than 5 but less than 10 undispersed particles per 1 cm² were recognized;

Rank 2: Not less than 10 but less than 50 undispersed particles per 1 cm² were recognized; and Rank 1: Not less than 50 undispersed particles per 1 cm² were recognized.

Example 1-1

Production of Composite Particles 5.0 kg of core particles (kind: titanium oxide (rutile type); particle shape: granular shape; average particle diameter:

0.056 µm; geometrical standard deviation value: 1.46; BET specific surface area value: 96.1 m$^2$/g; water content: 3.0%; L* value: 97.82; a* value: −0.80; b* value: 2.72; C* value: 2.83; light resistance (ΔE* value): 5.14) which were previously controlled in water content thereof, were charged into an edge runner "MPUV-2 Model" (tradename, manufactured by MATSUMOTO CHUZO TEKKOSHO CO., LTD.), and then 150 g of methyl hydrogen polysiloxane "TSF484" (tradename, produced by GE TOSHIBA SILICONE CO., LTD.) was added to the titanium oxide particles while operating the edge runner. The resultant mixture was continuously mixed and stirred at a linear load of 588 N/cm and a stirring speed of 22 rpm for 20 min.

Next, 2500 g of the dye D (kind: Tartrazine (Al lake); BET specific surface area value: 24.9 m$^2$/g; L* value: 79.59; a* value: 27.18; b* value: 95.34; C* value: 99.14; light resistance (ΔE* value): 20.17; anti-bleeding property (water-based): 81.9%; anti-bleeding property (solvent-based): 85.4%), was added to the titanium oxide particles coated with methyl hydrogen polysiloxane for 5 hours while operating the edge runner. Further, the resultant mixture was continuously mixed and stirred at a linear load of 588 N/cm and a stirring speed of 22 rpm for 60 min to form a dye D coat adhered on the coating layer composed of methyl hydrogen polysiloxane. Then, the thus obtained coated particles were heat-treated at 60° C. for 60 min by using a drier, thereby obtaining composite particles.

The resultant composite particles were granular particles having an average particle diameter of 0.058 µm. In addition, the composite particles had a geometrical standard deviation value of particle diameter of 1.45; a BET specific surface area value of 29.6 m$^2$/g; a hue represented by an L* value of 77.23, an a* value of 29.75, a b* value of 89.92 and a C* value of 94.71; a percentage of change in chromaticity of 4.5%; a tinting strength of 116%; a light resistance (ΔE* value) of 6.01; an anti-bleeding property (water-based) of 99.0%; and an anti-bleeding property (solvent-based) of 99.1%. The amount of methyl hydrogen polysiloxane coated was 1.22% by weight (calculated as Si), and the amount of the dye D coat adhered on the coating layer composed of methyl hydrogen polysiloxane is 12.06% by weight (calculated as C) (corresponding to about 50 parts by weight based on 100 parts by weight of the white inorganic particles).

As a result of observing the micrograph, since no dye D was recognized from the micrograph, it was confirmed that a substantially whole amount of the dye D used was adhered onto the coating layer composed of methyl hydrogen polysiloxane.

Example 2-1

Production of Water-Based Coloring Composition Containing Composite Particles

The composite particles obtained in Example 1-1, water and a water-soluble solvent were charged at the following mixing ratio into a 140 mL glass bottle together with 90 g of 3 mmφ glass beads. Next, the obtained mixture was mixed and dispersed for 90 min by a paint shaker, thereby preparing a water-based coloring composition.

Composition of Water-Based Coloring Composition:

| Composite particles | 57.9 parts by weight |
|---|---|
| Defoamer (tradename: "NOPCO 8034", produced by SUN NOPCO CO., LTD.) | 0.5 part by weight |
| Water | 22.4 parts by weight |
| Butyl cellosolve | 19.2 parts by weight |

The thus obtained water-based coloring composition exhibited a dispersion stability (ΔE* value) of 0.89 and a light resistance (ΔE* value) of 6.34.

Reference Example 2-1

Production of Water-Based Paint Using Water-Based Coloring Composition

The water-based coloring composition obtained in Example 2-1 and paint base materials such as a water-soluble alkyd resin were charged at the following mixing ratio into a 140 mL glass bottle together with 90 g of 3 mmφ glass beads. Next, the obtained mixture was mixed and dispersed for 90 min by a paint shaker, thereby preparing a water-based paint.

Composition of Water-Based Paint:

| Water-based coloring composition | 21.4 parts by weight |
|---|---|
| Water-soluble alkyd resin (tradename: S-118, produced by DAI-NIPPON INK KAGAKU KOGYO CO., LTD.) | 55.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

Next, the thus prepared water-based paint was applied onto a cold-rolled steel plate (0.8 mm×70 mm×150 mm; JIS G-3141) and dried to form a coating film having a thickness of 150 µm. The obtained coating film had a gloss of 96%; a hue represented by an L* value of 79.15, an a* value of 18.13, a b* value of 74.22 and a C* value of 76.40; and a light resistance (ΔE* value) of 6.16.

Example 3-1

Production of Solvent-Based Coloring Composition Containing Composite Particles

The composite particles produced in Example 1-1 and a thinner, were charged at the following mixing ratio into a 140 mL glass bottle together with 90 g of 3 mmφ glass beads. Next, the obtained mixture was mixed and dispersed for 90 min by a paint shaker, thereby preparing a solvent-based coloring composition.

Composition of Solvent-Based Coloring Composition:

| Composite particles | 23.0 parts by weight |
|---|---|
| Thinner | 77.0 parts by weight |

The thus obtained solvent-based coloring composition exhibited a dispersion stability (ΔE* value) of 0.90 and a light resistance (ΔE* value) of 6.39.

Reference Example 3-1

Production of Solvent-Based Paint Using Solvent-Based Coloring Composition

The solvent-based coloring composition obtained in Example 3-1 and paint base materials such as an amino alkyd resin were charged at the following mixing ratio into a 140 mL glass bottle together with 90 g of 3 mmϕ glass beads. Next, the obtained mixture was mixed and dispersed for 90 min by a paint shaker, thereby preparing a solvent-based paint.
Composition of Solvent-Based Paint:

| | |
|---|---|
| Solvent-based coloring composition | 16.5 parts by weight |
| Amino alkyd resin (AMILAC No. 1026, produced by KANSAI PAINT CO., LTD.) | 83.5 parts by weight |

Next, the thus prepared solvent-based paint was applied onto a cold-rolled steel plate (0.8 mm×70 mm×150 mm; JIS G-3141) and dried to form a coating film having a thickness of 150 μm. The obtained coating film had a gloss of 98%; a hue represented by an L* value of 78.97, an a* value of 18.10, a b* value of 74.13 and a C* value of 76.31; and a light resistance (ΔE* value) of 6.21.

Example 4-1

Production of Resin Composition 2.5 g of the composite particles obtained in Example 1-1, and 47.5 g of polyvinyl chloride resin particles "103EP8D" (produced by NIPPON ZEON CO., LTD.) were weighed and charged into a 100 mL poly-beaker, and intimately mixed with each other by a spatula, thereby obtaining mixed particles.

0.5 g of calcium stearate was added to the obtained mixed particles. The resultant mixture was intimately mixed and then slowly supplied to hot rolls heated to 160° C. whose clearance was set to 0.2 mm, and continuously kneaded therebetween until a uniform resin composition was produced. The resin composition kneaded was then separated from the hot rolls and used as a raw material for forming a colored resin plate.

Next, the thus-produced resin composition was interposed between a pair of surface-polished stainless steel plates, placed within a hot press heated to 180° C. and then subjected to a pressure molding while applying a pressure of 98 MPa thereto, thereby obtaining a colored resin plate having a thickness of 1 mm. The thus-produced colored resin plate had a dispersing condition of Rank 5; a hue represented by an L* value of 79.30, an a* value of 17.99, a b* value of 73.87 and a C* value of 76.03; and a light resistance (ΔE* value) of 6.25.

Next, according to Examples 1-1 to 4-1 and Reference Examples 2-1 to 3-1, the composite particles, the water-based coloring composition, the water-based paint, the solvent-based coloring composition, the solvent-based paint and the resin composition were produced. The essential production conditions as well as various properties of the thus obtained composite particles, water-based coloring composition, water-based paint, solvent-based coloring composition, solvent-based paint and resin composition, are shown in Tables.

Core Particles 1 to 7:

White inorganic particles as core particles 1 to 7 having properties as shown in Table 1 were prepared.

Dyes and Lakes:

Dyes and lakes having properties as shown in Table 2 were prepared.

Examples 1-2 to 1-7 and Comparative Examples 1-1

The same procedure as defined in Example 1-1 was conducted except that kinds and amounts of additives added in coating step with surface modifier, linear load and treating time for edge runner treatment used in the coating step with surface modifier, kinds and amounts of dye or lake adhered in dye or lake-adhering step, and linear load and treating time for edge runner treatment used in the dye or lake-adhering step, were changed variously, thereby obtaining composite particles.

Meanwhile, in Example 1-3, 25 parts by weight of the dye B was added 8 times to 100 parts by weight of the core particles while operating the edge runner such that the total amount of the dye B added was 200.0 parts by weight. In Example 1-5, 100 parts by weight of the dye E was added to 100 parts by weight of the core particles for 240 min.

The essential production conditions are shown in Table 3, and various properties of the obtained composite pigments are shown in Table 4.

As a result of observing the micrographs of the composite particles obtained in Examples 1-2 to 1-7, since no dye or lake was recognized from the micrographs, it was confirmed that a substantially whole amount of the dye or lake used was adhered onto the surface modifier-coated white inorganic particles.

Examples 2-2 to 2-7 and Comparative Examples 2-1 to 2-7

Water-Based Coloring Composition

The same procedure as defined in Example 2-1 was conducted except that kinds of colored particles were changed variously, thereby obtaining water-based coloring compositions.

The essential production conditions and various properties of the obtained water-based coloring compositions are shown in Table 5.

Reference Examples 2-2 to 2-7 and Comparative Reference Examples 2-1 to 2-7

Water-Based Paint

The same procedure as defined in Reference Example 2-1 was conducted except that kinds of water-based coloring compositions were changed variously, thereby obtaining water-based paints.

The thus obtained water-based paints were applied onto a cold-rolled steel plate (0.8 mm×70 mm×150 mm; JIS G-3141) and dried to form a coating film having a thickness of 150 μm. Various properties of the obtained coating film are shown in Table 6.

Examples 3-2 to 3-7 and Comparative Examples 3-1 to 3-7

Solvent-Based Coloring Composition

The same procedure as defined in Example 3-1 was conducted except that kinds of colored particles were changed variously, thereby obtaining solvent-based coloring compositions.

The essential production conditions and various properties of the obtained solvent-based coloring compositions are shown in Table 7.

Reference Examples 3-2 to 3-7 and Comparative Reference Examples 3-1 to 3-7

Solvent-Based Paint

The same procedure as defined in Reference Example 3-1 was conducted except that kinds of solvent-based coloring compositions were changed variously, thereby obtaining solvent-based paints.

The thus obtained solvent-based paints were applied onto a cold-rolled steel plate (0.8 mm×70 mm×150 mm; JIS G-3141) and dried to form a coating film having a thickness of 150 μm. Various properties of the obtained coating film are shown in Table 8.

Examples 4-2 to 4-7 and Comparative Examples 4-1 to 4-7

Resin composition

The same procedure as defined in Example 4-1 was conducted except that kinds of colored particles were changed variously, thereby obtaining resin compositions.

The essential production conditions and various properties of the obtained resin compositions are shown in Table 9.

TABLE 1

| | Properties of white inorganic particles | | |
|---|---|---|---|
| Kind of core particles | Kind | Shape | Average particle diameter (μm) |
| Core particles 1 | Titanium oxide (rutile type) | Granular | 0.056 |
| Core particles 2 | Titanium oxide (anatase type) | Granular | 0.021 |
| Core particles 3 | Silica | Spherical | 0.014 |
| Core particles 4 | Zinc oxide | Spherical | 0.183 |
| Core particles 5 | Precipitated barium sulfate | Granular | 0.059 |
| Core particles 6 | Pearl mica | Plate-shaped | 2.323 |
| Core particles 7 | Titanium oxide (anatase type) | Granular | 0.021 |

TABLE 1-continued

| | Properties of white inorganic particles | | |
|---|---|---|---|
| Kind of core particles | Geometrical standard deviation value (—) | Water content (%) | BET specific surface area value ($m^2/g$) |
| Core particles 1 | 1.46 | 3.0 | 96.1 |
| Core particles 2 | 1.41 | 2.5 | 49.6 |
| Core particles 3 | 1.32 | 7.2 | 200.4 |
| Core particles 4 | 1.62 | 1.0 | 18.3 |
| Core particles 5 | 1.73 | 1.6 | 21.3 |
| Core particles 6 | 2.16 | 0.5 | 10.6 |
| Core particles 7 | 1.41 | 0.05 | 50.0 |

| | Properties of white inorganic particles | | | | |
|---|---|---|---|---|---|
| | Hue | | | | Light |
| Kind of core particles | $L^*$ value (—) | $a^*$ value (—) | $b^*$ value (—) | $C^*$ value (—) | resistance ($\Delta E^*$ value) (—) |
| Core particles 1 | 97.82 | −0.80 | 2.72 | 2.83 | 5.14 |
| Core particles 2 | 97.58 | −1.56 | −0.15 | 1.57 | 8.37 |
| Core particles 3 | 93.93 | −2.02 | −4.36 | 4.81 | 5.29 |
| Core particles 4 | 90.66 | −2.17 | 5.31 | 5.74 | 5.86 |
| Core particles 5 | 93.23 | 0.45 | 1.55 | 1.61 | 5.92 |
| Core particles 6 | 92.16 | −1.98 | 3.64 | 4.14 | 9.25 |
| Core particles 7 | 97.61 | −1.55 | −0.16 | 1.56 | 8.39 |

TABLE 2

| | Properties of dyes | | |
|---|---|---|---|
| Kind of dyes | Kind | Lake | BET specific surface area value ($m^2/g$) |
| Dye A | Brilliant blue FCF | Al | 34.7 |
| Dye B | Phloxine B | Al | 142.1 |
| Dye C | Helindon pink CN | — | 32.0 |
| Dye D | Tartrazine | Al | 24.9 |
| Dye E | Sunset Yellow FCF | Al | 30.6 |
| Dye F | Tartrazine | — | 35.3 |

| | Properties of dyes | | | | |
|---|---|---|---|---|---|
| | Hue | | | | Light resistance |
| Kind of dyes | $L^*$ value (—) | $a^*$ value (—) | $b^*$ value (—) | $C^*$ value (—) | ($\Delta E^*$ value) (—) |
| Dye A | 35.76 | −18.65 | −40.71 | 44.78 | 16.36 |
| Dye B | 38.72 | 64.39 | 16.57 | 66.49 | 33.26 |

TABLE 2-continued

| | | | | | |
|---|---|---|---|---|---|
| Dye C | 44.47 | 55.80 | 31.16 | 63.91 | 13.45 |
| Dye D | 79.59 | 27.18 | 95.34 | 99.14 | 20.17 |
| Dye E | 54.17 | 58.29 | 66.55 | 88.47 | 25.72 |
| Dye F | 35.3 | 62.60 | 51.19 | 66.95 | 84.28 |

Properties of dyes
Anti-bleeding property

| Kind of dyes | Water-based (%) | Solvent-based (%) |
|---|---|---|
| Dye A | 77.1 | 76.0 |
| Dye B | 78.2 | 76.4 |
| Dye C | 89.1 | 88.5 |
| Dye D | 81.9 | 85.4 |
| Dye E | 79.8 | 84.8 |
| Dye F | 34.2 | 64.3 |

TABLE 3

Production of composite particles
Coating step with surface modifier
Additives

| Examples and Comparative Examples | Kind of core particles | Kind | Amount added (wt. part) |
|---|---|---|---|
| Example 1-1 | Core particles 1 | Methyl hydrogen polysiloxane | 3.0 |
| Example 1-2 | Core particles 2 | Methyl hydrogen polysiloxane | 2.0 |
| Example 1-3 | Core particles 3 | Methyl hydrogen polysiloxane | 4.0 |
| Example 1-4 | Core particles 4 | Methyl triethoxysilane | 1.0 |
| Example 1-5 | Core particles 5 | γ-aminopropyl triethoxysilane | 10.0 |
| Example 1-6 | Core particles 6 | Isobutyltriisostearoyl titanate | 5.0 |
| Example 1-7 | Core particles 7 | Methyl hydrogen polysiloxane | 2.0 |
| Comparative Example 1-1 | Core particles 2 | — | — |

Production of composite particles
Coating step with surface modifier

| Examples and Comparative Examples | Edge runner treatment Linear load (N/cm) | Time (min) | Coating treatment Calculated as | Amount treated (wt %) |
|---|---|---|---|---|
| Example 1-1 | 588 | 20 | Si | 1.22 |
| Example 1-2 | 441 | 20 | Si | 0.82 |
| Example 1-3 | 735 | 30 | Si | 1.61 |
| Example 1-4 | 588 | 30 | Si | 0.15 |
| Example 1-5 | 588 | 30 | Si | 1.15 |
| Example 1-6 | 294 | 20 | Ti | 0.25 |
| Example 1-7 | 441 | 20 | Si | 0.82 |
| Comparative Example 1-1 | — | — | — | — |

TABLE 3-continued

Production of composite particles
Adhesion step with dye or lake

| Examples and Comparative Examples | Dye Kind | Amount adhered (wt. part) | Edge runner treatment Linear load (N/cm) | Time (min) | Amount adhered (calculated as C) (wt. %) |
|---|---|---|---|---|---|
| Example 1-1 | D | 50.0 | 588 | 360 | 12.06 |
| Example 1-2 | A | 70.0 | 588 | 360 | 23.27 |
| Example 1-3 | B | 200.0 | 588 | 240 | 19.54 |
| Example 1-4 | C | 10.0 | 441 | 120 | 4.81 |
| Example 1-5 | E | 100.0 | 735 | 300 | 21.07 |
| Example 1-6 | F | 30.0 | 294 | 90 | 8.35 |
| Example 1-7 | A | 70.0 | 588 | 360 | 23.23 |
| Comparative Example 1-1 | A | 70.0 | 588 | 360 | 23.22 |

TABLE 4

Properties of composite particles

| Examples and Comparative Examples | Average particle diameter (μm) | Geometrical standard deviation (—) | BET specific surface area value (m²/g) |
|---|---|---|---|
| Example 1-1 | 0.058 | 1.45 | 29.6 |
| Example 1-2 | 0.023 | 1.41 | 41.1 |
| Example 1-3 | 0.020 | 1.32 | 101.6 |
| Example 1-4 | 0.184 | 1.61 | 17.6 |
| Example 1-5 | 0.061 | 1.71 | 22.3 |
| Example 1-6 | 2.324 | 1.89 | 8.8 |
| Example 1-7 | 0.023 | 1.41 | 41.9 |
| Comparative Example 1-1 | 0.021 | 1.46 | 27.5 |

Properties of composite particles
Hue

| Examples and Comparative Examples | L* value (—) | a* value (—) | b* value (—) | C* value (—) | Change in chromaticity (%) |
|---|---|---|---|---|---|
| Example 1-1 | 77.23 | 29.75 | 89.92 | 94.71 | 4.5 |
| Example 1-2 | 37.54 | −15.60 | −36.08 | 39.31 | 12.2 |
| Example 1-3 | 38.15 | 62.38 | 11.71 | 63.47 | 4.5 |
| Example 1-4 | 39.07 | 61.26 | 15.63 | 63.22 | 1.1 |
| Example 1-5 | 53.16 | 54.23 | 52.68 | 75.60 | 14.5 |
| Example 1-6 | 46.63 | 40.65 | 68.36 | 79.53 | 5.6 |
| Example 1-7 | 37.61 | −15.48 | −33.82 | 37.19 | 16.9 |
| Comparative Example 1-1 | 38.23 | −15.62 | −30.14 | 33.95 | 24.2 |

Properties of composite particles

| Examples and Comparative Examples | Light resistance Tinting strength (%) | (ΔE* value) (—) | Anti-bleeding property Water-based (%) | Solvent-based (%) |
|---|---|---|---|---|
| Example 1-1 | 116 | 6.01 | 99.0 | 99.1 |
| Example 1-2 | 113 | 5.19 | 99.1 | 99.2 |
| Example 1-3 | 122 | 7.65 | 98.4 | 98.6 |
| Example 1-4 | 110 | 4.32 | 99.1 | 99.0 |
| Example 1-5 | 114 | 6.58 | 98.9 | 99.1 |
| Example 1-6 | 111 | 6.27 | 96.1 | 97.5 |

TABLE 4-continued

| | | | | |
|---|---|---|---|---|
| Example 1-7 | 103 | 8.86 | 95.8 | 95.9 |
| Comparative Example 1-1 | 92 | 14.29 | 92.7 | 92.4 |

TABLE 5

| | | Production of water-based coloring composition | Properties of water-based coloring composition | |
|---|---|---|---|---|
| Examples and Comparative Examples | | Kind of coloring particles | Dispersion stability (ΔE* value) (—) | Light resistance (ΔE* value) (—) |
| Example 2-1 | | Example 1-1 | 0.89 | 6.34 |
| Example 2-2 | | Example 1-2 | 0.89 | 5.44 |
| Example 2-3 | | Example 1-3 | 0.91 | 7.87 |
| Example 2-4 | | Example 1-4 | 0.82 | 4.51 |
| Example 2-5 | | Example 1-5 | 0.88 | 6.78 |
| Example 2-6 | | Example 1-6 | 0.85 | 6.58 |
| Example 2-7 | | Example 1-7 | 1.09 | 9.12 |
| Comparative Example 2-1 | | Dye A | 1.64 | 17.15 |
| Comparative Example 2-2 | | Dye B | 1.69 | 33.81 |
| Comparative Example 2-3 | | Dye C | 1.75 | 14.22 |
| Comparative Example 2-4 | | Dye D | 1.61 | 20.76 |
| Comparative Example 2-5 | | Dye E | 1.57 | 26.40 |
| Comparative Example 2-6 | | Dye F | 0.92 | 24.18 |
| Comparative Example 2-7 | | Comparative Example 1-1 | 1.77 | 14.82 |

TABLE 6

| Reference Examples and Comparative Reference Examples | Kind of water-based coloring composition | Properties of coating film 60° Gloss (%) |
|---|---|---|
| Reference Example 2-1 | Example 2-1 | 96 |
| Reference Example 2-2 | Example 2-2 | 94 |
| Reference Example 2-3 | Example 2-3 | 93 |
| Reference Example 2-4 | Example 2-4 | 90 |
| Reference Example 2-5 | Example 2-5 | 90 |
| Reference Example 2-6 | Example 2-6 | 85 |
| Reference Example 2-7 | Example 2-7 | 75 |
| Comparative Reference Example 2-1 | Comparative Example 2-1 | 62 |
| Comparative Reference Example 2-2 | Comparative Example 2-2 | 65 |
| Comparative Reference Example 2-3 | Comparative Example 2-3 | 66 |
| Comparative Reference Example 2-4 | Comparative Example 2-4 | 65 |
| Comparative Reference Example 2-5 | Comparative Example 2-5 | 64 |
| Comparative Reference Example 2-6 | Comparative Example 2-6 | 63 |
| Comparative Reference Example 2-7 | Comparative Example 2-7 | 68 |

| Reference Examples and Comparative Reference Examples | Properties of coating film | | | | |
|---|---|---|---|---|---|
| | Hue | | | | Light resistance |
| | L* value (—) | a* value (—) | b* value (—) | C* value (—) | (ΔE* value) (—) |
| Reference Example 2-1 | 79.15 | 18.13 | 74.22 | 76.40 | 6.16 |
| Reference Example 2-2 | 45.96 | −15.83 | −35.77 | 39.12 | 5.32 |
| Reference Example 2-3 | 49.01 | 59.95 | −3.41 | 60.05 | 7.75 |
| Reference Example 2-4 | 46.58 | 56.46 | 28.90 | 63.43 | 4.41 |
| Reference Example 2-5 | 59.11 | 54.31 | 48.84 | 73.04 | 6.67 |
| Reference Example 2-6 | 62.33 | 46.74 | 61.69 | 77.40 | 6.48 |
| Reference Example 2-7 | 46.02 | −15.62 | −32.58 | 36.13 | 9.01 |
| Comparative Reference Example 2-1 | 33.24 | −8.38 | −28.69 | 29.89 | 17.05 |
| Comparative Reference Example 2-2 | 45.31 | 62.67 | 21.45 | 66.24 | 33.70 |
| Comparative Reference Example 2-3 | 42.62 | 54.82 | 34.68 | 64.87 | 14.10 |
| Comparative Reference Example 2-4 | 71.95 | 29.24 | 80.53 | 85.67 | 20.65 |
| Comparative Reference Example 2-5 | 52.76 | 60.19 | 48.32 | 77.19 | 26.31 |
| Comparative Reference Example 2-6 | 60.03 | 53.90 | 58.31 | 79.41 | 24.08 |
| Comparative Reference Example 2-7 | 46.39 | −9.95 | −28.25 | 29.95 | 14.71 |

TABLE 7

| | | Production of solvent-based coloring composition | Properties of solvent-based coloring composition | |
|---|---|---|---|---|
| Examples and Comparative Examples | | Kind of coloring particles | Dispersion stability (ΔE* value) (—) | Light resistance (ΔE* value) (—) |
| Example 3-1 | | Example 1-1 | 0.90 | 6.39 |
| Example 3-2 | | Example 1-2 | 0.91 | 5.48 |
| Example 3-3 | | Example 1-3 | 0.95 | 7.94 |
| Example 3-4 | | Example 1-4 | 0.84 | 4.56 |
| Example 3-5 | | Example 1-5 | 0.91 | 6.88 |
| Example 3-6 | | Example 1-6 | 0.87 | 6.62 |
| Example 3-7 | | Example 1-7 | 1.11 | 9.18 |
| Comparative Example 3-1 | | Dye A | 1.65 | 17.06 |
| Comparative Example 3-2 | | Dye B | 1.71 | 33.95 |
| Comparative Example 3-3 | | Dye C | 1.78 | 14.18 |

TABLE 7-continued

| Examples and Comparative Examples | Production of solvent-based coloring composition Kind of coloring particles | Properties of solvent-based coloring composition | |
|---|---|---|---|
| | | Dispersion stability (ΔE* value) (—) | Light resistance (ΔE* value) (—) |
| Comparative Example 3-4 | Dye D | 1.64 | 20.89 |
| Comparative Example 3-5 | Dye E | 1.59 | 26.44 |
| Comparative Example 3-6 | Dye F | 1.43 | 24.23 |
| Comparative Example 3-7 | Comparative Example 1-1 | 1.79 | 14.87 |

TABLE 8

| Reference Examples and Comparative Reference Examples | Kind of solvent-based coloring composition | Properties of coating film 60° Gloss (%) |
|---|---|---|
| Reference Example 3-1 | Example 3-1 | 98 |
| Reference Example 3-2 | Example 3-2 | 95 |
| Reference Example 3-3 | Example 3-3 | 95 |
| Reference Example 3-4 | Example 3-4 | 91 |
| Reference Example 3-5 | Example 3-5 | 92 |
| Reference Example 3-6 | Example 3-6 | 87 |
| Reference Example 3-7 | Example 3-7 | 76 |
| Comparative Reference Example 3-1 | Comparative Example 3-1 | 65 |
| Comparative Reference Example 3-2 | Comparative Example 3-2 | 68 |
| Comparative Reference Example 3-3 | Comparative Example 3-3 | 69 |
| Comparative Reference Example 3-4 | Comparative Example 3-4 | 67 |
| Comparative Reference Example 3-5 | Comparative Example 3-5 | 68 |
| Comparative Reference Example 3-6 | Comparative Example 3-6 | 66 |
| Comparative Reference Example 3-7 | Comparative Example 3-7 | 70 |

| Reference Examples and Comparative Reference Examples | Properties of coating film | | | | |
|---|---|---|---|---|---|
| | Hue | | | | Light resistance |
| | L* value (—) | a* value (—) | b* value (—) | C* value (—) | (ΔE* value) (—) |
| Reference Example 3-1 | 78.97 | 18.10 | 74.13 | 76.31 | 6.21 |
| Reference Example 3-2 | 45.66 | −15.88 | −35.86 | 39.22 | 5.40 |
| Reference Example 3-3 | 48.73 | 60.08 | −3.53 | 60.18 | 7.86 |
| Reference Example 3-4 | 46.32 | 53.32 | 28.65 | 60.53 | 4.51 |
| Reference Example 3-5 | 58.87 | 54.44 | 48.30 | 72.78 | 6.79 |
| Reference Example 3-6 | 62.13 | 46.62 | 61.64 | 77.28 | 6.58 |
| Reference Example 3-7 | 45.98 | −15.72 | −32.81 | 36.38 | 9.12 |
| Comparative Reference Example 3-1 | 33.04 | −8.65 | −28.99 | 30.25 | 16.97 |
| Comparative Reference Example 3-2 | 44.92 | 62.51 | 22.78 | 66.53 | 33.84 |
| Comparative Reference Example 3-3 | 42.50 | 53.98 | 34.52 | 64.07 | 14.10 |
| Comparative Reference Example 3-4 | 71.87 | 29.16 | 81.47 | 86.53 | 20.82 |
| Comparative Reference Example 3-5 | 52.14 | 59.76 | 48.17 | 76.76 | 26.38 |
| Comparative Reference Example 3-6 | 59.65 | 53.60 | 57.63 | 78.70 | 24.13 |
| Comparative Reference Example 3-7 | 46.16 | −10.38 | −28.56 | 30.39 | 14.78 |

TABLE 9

| Examples and Comparative Examples | Kind of resin composition Kind of coloring particles | Properties of resin composition Dispersing condition (—) |
|---|---|---|
| Example 4-1 | Example 1-1 | 5 |
| Example 4-2 | Example 1-2 | 5 |
| Example 4-3 | Example 1-3 | 4 |
| Example 4-4 | Example 1-4 | 5 |
| Example 4-5 | Example 1-5 | 4 |
| Example 4-6 | Example 1-6 | 5 |
| Example 4-7 | Example 1-7 | 3 |
| Comparative Example 4-1 | Dye A | 2 |
| Comparative Example 4-2 | Dye B | 2 |
| Comparative Example 4-3 | Dye C | 2 |
| Comparative Example 4-4 | Dye D | 2 |
| Comparative Example 4-5 | Dye E | 2 |
| Comparative Example 4-6 | Dye F | 3 |
| Comparative Example 4-7 | Comparative Example 1-1 | 1 |

| Examples and Comparative Examples | Properties of resin composition | | | | |
|---|---|---|---|---|---|
| | Hue | | | | Light resistance |
| | L* value (—) | a* value (—) | b* value (—) | C* value (—) | (ΔE* value) (—) |
| Example 4-1 | 79.30 | 17.99 | 73.87 | 76.03 | 6.25 |
| Example 4-2 | 46.16 | −15.03 | −35.41 | 38.47 | 5.43 |
| Example 4-3 | 49.15 | 59.01 | −2.99 | 59.09 | 7.89 |
| Example 4-4 | 46.71 | 55.38 | 28.45 | 62.26 | 4.53 |
| Example 4-5 | 59.23 | 53.26 | 48.36 | 71.94 | 6.82 |
| Example 4-6 | 62.45 | 45.97 | 61.28 | 76.61 | 6.61 |
| Example 4-7 | 46.27 | −14.75 | −32.39 | 35.59 | 9.15 |

TABLE 9-continued

| | | | | | |
|---|---|---|---|---|---|
| Comparative Example 4-1 | 33.36 | −7.65 | −27.97 | 29.00 | 17.17 |
| Comparative Example 4-2 | 45.42 | 61.77 | 21.00 | 65.24 | 33.88 |
| Comparative Example 4-3 | 42.72 | 54.01 | 34.12 | 63.88 | 14.20 |
| Comparative Example 4-4 | 72.08 | 28.15 | 80.03 | 84.84 | 20.76 |
| Comparative Example 4-5 | 52.90 | 59.21 | 47.89 | 76.15 | 26.44 |
| Comparative Example 4-6 | 60.15 | 52.94 | 57.96 | 78.50 | 24.20 |
| Comparative Example 4-7 | 46.52 | −9.08 | −27.78 | 29.23 | 14.82 |

What is claimed is:

1. Composite particles which consists of:
   white inorganic particles selected from the group consisting of titanium dioxide, zinc oxide, titanium mica, muscovite, silica powder, white carbon, fine silicic acid powder, diatomaceous earth, clay, calcium carbonate, barium sulfate, alumina white, talc, and transparent titanium oxide,
   a surface modifier coating layer formed on a surface of the respective white inorganic particles, and
   a dye coat adhered onto the surface of the respective surface-modifier-coated white inorganic particles,
   which composite particles have an anti-bleeding property of not less than 94% as measured in a water-based or a solvent-based composition; and
   which dye has an anti-bleeding property of not more than 89.1% and 88.5% as measured in water and a solvent, respectively;
   wherein the anti-bleeding property of the composite particles is measured by the following procedure: 1 g of the sample particles to be measured and 50 mL of purified water are subjected to ultrasonic dispersion for 60 min, the obtained dispersion is subjected to centrifugal separation at a rotating speed of 10000 rpm for 15 min to separate a supernatant therefrom, and the light transmittance of the thus separated supernatant is measured in a wavelength range of 380 to 720 nm by a UV-visible recording spectrophotometer, the anti-bleeding property being expressed by the minimum light transmittance in the measured range, and
   wherein the anti-bleeding property of the dye is measured by the following procedure: 1 g of the sample dye to be measured and 50 mL of purified water or ethanol are subjected to ultrasonic dispersion for 60 min, the obtained dispersion is subjected to centrifugal separation at a rotating speed of 10000 rpm for 15 min to separate a supernatant therefrom, and the light transmittance of the thus separated supernatant is measured in a wavelength range of 380 to 720 nm by a UV-visible recording spectrophotometer, the anti-bleeding property being expressed by the minimum light transmittance in the measured range.

2. The composite particles according to claim 1, wherein said surface modifier is an organosilicon compound or a coupling agent.

3. The composite particles according to claim 1, wherein an amount of said surface modifier coated is 0.01 to 15.0% by weight, calculated as C, based on the weight of the white inorganic particles.

4. The composite particles according to claim 1, wherein an amount of said dye adhered is 0.01 to 500 parts by weight based on 100 parts by weight of the white inorganic particles.

5. The composite particles according to claim 1, wherein said composite particles have an average particle diameter of 0.001 to 10.0 μm, and have a geometrical standard deviation of particle diameter of not more than 2.0.

6. The composite particles according to claim 1, wherein said composite particles have a BET specific surface area value of 0.5 to 500 $m^2/g$, a tinting strength of not less than 102% and a light resistance ($\Delta E^*$ value) of not more than 10.0.

7. The composite particles according to claim 1, wherein the dye is a dye selected from the group consisting of amaranth, etythrosine, new coccin, phloxine B, rose bengal, acid red, tartrazine, sunset yellow FCF, fast green FCF, brilliant blue FCF, indigo carmine, lithol rubin B, rhodamine B, rhodamine B acetate, rhodamine B stearate, tetrachlorotetrabromofluorescein, tetrabromfluorescein, Sudan III, helindone pink CN, fast acid magenta, eosine YS, eosine YSK, phloxine BK, rose bengal K, dibromofluorescein, orange II, diiodofluorescein, erythrosine yellow NA, fluorescein, uranine, uranine K, quinoline yellow WS, quinoline yellow SS, alizarin cyanine green F, quinizarine green SS, pyranine conc, light green SF yellowish, indigo, patent blue NA, patent blue CA, carbanthrene blue, alphazurine FG, resorcin brown, alizurin purple SS, violamine R, Scarlet Red N.F., Ponceau 3R, Ponceau R, Ponceau SX, oil red XO, fast red S, orange I, orange SS, polar yellow 5G, naphthol yellow S, yellow AB, yellow OB, metanil yellow, fast light yellow 3G, naphthol green B, guinea green B, Sudan blue B, alizurol purple, naphthol blue black, turquoise blue, alizarin, basic flavin, auramine, rhodamine 6G, anthrafloxine, methyl violet, crystal violet, Victoria blue BO, Victoria blue B, basic cyanine, diamond green, malachite green, magenta, quinizarine, thioflavin, phthalein and a mixture of two or more of said dyes.

8. Composite particles consisting of:
   white inorganic particles selected from the group consisting of titanium dioxide, zinc oxide, titanium mica, muscovite, silica powder, white carbon, fine silicic acid powder, diatomaceous earth, clay, calcium carbonate, barium sulfate, alumina white, talc, and transparent titanium oxide,
   a surface modifier coating layer formed on a surface of the respective white inorganic particles, and a lake coat formed from a dye, wherein said lake coat is adhered onto the surface of the respective surface modifier-coated white inorganic particles,
   which composite particles have an anti-bleeding property of not less than 94% as measured in a water-based or a solvent-based composition; and
   which dye has an anti-bleeding property of not more than 89.1% and 88.5% as measured in water and a solvent, respectively;
   wherein the anti-bleeding property of the composite particles is measured by the following procedure: 1 g of the sample particles to be measured and 50 mL of purified water are subjected to ultrasonic dispersion for 60 min, the obtained dispersion is subjected to centrifugal separation at a rotating speed of 10000 rpm for 15 min to separate a supernatant therefrom, and the light transmittance of the thus separated supernatant is measured in a wavelength range of 380 to 720 nm by a UV-visible recording spectrophotometer, the anti-bleeding property being expressed by the minimum light transmittance in the measured range, and
   wherein the anti-bleeding property of the dye is measured by the following procedure: 1 g of the sample dye to be measured and 50 mL of purified water or ethanol are subjected to ultrasonic dispersion for 60 min, the obtained dispersion is subjected to centrifugal separation at a rotating speed of 10000 rpm for 15 min to separate a supernatant therefrom, and the light transmittance of the thus separated supernatant is measured in a wavelength range of 380 to 720 nm by a UV-visible recording spectrophotometer, the anti-bleeding property being expressed by the minimum light transmittance in the measured range.

9. The composite particles according to claim 8, wherein said surface modifier is an organosilicon compound or a coupling agent.

10. The composite particles according to claim 8, wherein an amount of said surface modifier coated is 0.01 to 15.0% by weight, calculated as C, based on the weight of the white inorganic particles.

11. The composite particles according to claim 8, wherein said lake is obtained by insolubilizing at least one of said dyes with a precipitant.

12. The composite particles according to claim 11, wherein said precipitant is an aluminum compound, a barium compound or a zirconium compound.

13. The composite particles according to claim 8, wherein an amount of said lake adhered is 0.01 to 500 parts by weight based on 100 parts by weight of the white inorganic particles.

14. The composite particles according to claim 8, wherein said composite particles have an average particle diameter of 0.001 to 10.0 µm, and have a geometrical standard deviation of particle diameter of not more than 2.0.

15. The composite particles according to claim 8, wherein said composite particles have a BET specific surface area value of 0.5 to 500 m$^2$/g, a tinting strength of not less than 102% and a light resistance (ΔE* value) of not more than 10.

16. The composite particles according to claim 8, wherein the dye is a dye selected from the group consisting of amaranth, etythrosine, new coccin, phloxine B, rose bengal, acid red, tartrazine, sunset yellow FCF, fast green FCF, brilliant blue FCF, indigo carmine, lithol rubin B, rhodamine B, rhodamine B acetate, rhodamine B stearate, tetrachlorotetrabromofluorescein, tetrabromfluorescein, Sudan III, helindone pink CN, fast acid magenta, eosine YS, eosine YSK, phloxine BK, rose bengal K, dibromofluorescein, orange II, diiodofluorescein, erythrosine yellow NA, fluorescein, uranine, uranine K, quinoline yellow WS, quinoline yellow SS, alizarin cyanine green F, quinizarine green SS, pyranine conc, light green SF yellowish, indigo, patent blue NA, patent blue CA, carbanthrene blue, alphazurine FG, resorcin brown, alizurin purple SS, violamine R, Scarlet Red N.F., Ponceau 3R, Ponceau R, Ponceau SX, oil red XO, fast red S, orange I, orange SS, polar yellow 5G, naphthol yellow S, yellow AB, yellow OB, metanil yellow, fast light yellow 3G, naphthol green B, guinea green B, Sudan blue B, alizurol purple, naphthol blue black, turquoise blue, alizarin, basic flavin, auramine, rhodamine 6G, anthrafloxine, methyl violet, crystal violet, Victoria blue BO, Victoria blue B, basic cyanine, diamond green, malachite green, magenta, quinizarine, thioflavin, phthalein and a mixture of two or more of said dyes.

17. A coloring composition for water-based paints comprising the composite particles as defined in claim 1 and water, a water-soluble solvent or a mixture thereof as a solvent.

18. The coloring composition for water-based paints according to claim 17, wherein a content of the composite particles in the composition is 1 to 200 parts by weight based on 100 parts by weight of the solvent.

19. A coloring composition for solvent-based paints comprising the composite particles as defined in claim 1 in an organic solvent.

20. The coloring composition for solvent-based paints according to claim 19, wherein a content of the composite particles in the composition is 1 to 200 parts by weight based on 100 parts by weight of the organic solvent.

21. A resin composition comprising the composite particles as defined in claim 1, and a thermoplastic resin.

22. The resin composition according to claim 21, wherein a content of said composite particles in the composition is 0.01 to 200 parts by weight based on 100 parts by weight of the thermoplastic resin.

23. The composite particles according to claim 1, wherein the anti-bleeding property is not less than 95%.

24. The composite particles according to claim 1, wherein the anti-bleeding property is not less than 96%.

25. The composite particles according to claim 1, wherein the anti-bleeding property is not less than 95%.

26. The composite particles according to claim 8, wherein the anti-bleeding property is not less than 96%.

27. Composite particles having an average particle diameter of 0.001 to 10.0 µm, and have a geometrical standard deviation of particle diameter of not more than 2.0 and consisting of
white inorganic particles selected from the group consisting of titanium dioxide, zinc oxide, titanium mica, muscovite, silica powder, white carbon, fine silicic acid powder, diatomaceous earth, clay, calcium carbonate, barium sulfate, alumina white, talc, and transparent titanium oxide,
a surface modifier coating layer formed on surface of the respective white inorganic particles, and
a lake coat adhered onto the surface of the respective surface modifier-coated white inorganic particles formed from a dye,
which composite particles has an anti-bleeding property of not less than 96% as measured in a water-based or a solvent-based composition; and
which dye has an anti-bleeding property of not more than 89.1% and 88.5% as measured in water and a solvent, respectively;
wherein the anti-bleeding property of the composite particles is measured by the following procedure: 1 g of the sample particles to be measured and 50 mL of purified water are subjected to ultrasonic dispersion for 60 min, the obtained dispersion is subjected to centrifugal separation at a rotating speed of 10000 rpm for 15 min to separate a supernatant therefrom, and the light transmittance of the thus separated supernatant is measured in a wavelength range of 380 to 720 nm by a UV-visible recording spectrophotometer, the anti-bleeding property being expressed by the minimum light transmittance in the measured range, and
wherein the anti-bleeding property of the dye is measured by the following procedure: 1 g of the sample dye to be measured and 50 mL of purified water or ethanol are subjected to ultrasonic dispersion for 60 min, the obtained dispersion is subjected to centrifugal separation at a rotating speed of 10000 rpm for 15 min to separate a supernatant therefrom, and the light transmittance of the thus separated supernatant is measured in a wavelength range of 380 to 720 nm by a UV-visible recording spectrophotometer, the anti-bleeding property being expressed by the minimum light transmittance in the measured range.

28. The composite particles according to claim 27, wherein the dye is a dye selected from the group consisting of amaranth, etythrosine, new coccin, phloxine B, rose bengal, acid red, tartrazine, sunset yellow FCF, fast green FCF, brilliant blue FCF, indigo carmine, lithol rubin B, rhodamine B, rhodamine B acetate, rhodamine B stearate, tetrachlorotetrabromofluorescein, tetrabromfluorescein, Sudan III, helindone pink CN, fast acid magenta, eosine YS, eosine YSK, phloxine BK, rose bengal K, dibromofluorescein, orange II, diiodofluorescein, erythrosine yellow NA, fluorescein, uranine, uranine K, quinoline yellow WS, quinoline yellow SS, alizarin cyanine green F, quinizarine green SS, pyranine conc, light green SF yellowish, indigo, patent blue NA, patent blue CA, carbanthrene blue, alphazurine FG, resorcin brown, alizurin purple SS, violamine R, Scarlet Red N.F., Ponceau 3R, Ponceau R, Ponceau SX, oil red XO, fast red S, orange I, orange SS, polar yellow 5G, naphthol yellow S, yellow AB, yellow OB, metanil yellow, fast light yellow 3G, naphthol green B, guinea green B, Sudan blue B, alizurol purple, naphthol blue black, turquoise blue, alizarin, basic flavin, auramine, rhodamine 6G, anthrafloxine, methyl violet, crystal violet, Victoria blue BO, Victoria blue B, basic cyanine, diamond green, malachite green, magenta, quinizarine, thioflavin, phthalein and a mixture of two or more of said dyes.

\* \* \* \* \*